July 2, 1929. J. R. McWANE Re. 17,362
MEANS FOR SUPPORTING CORE BARS IN FLASKS
Original Filed Dec. 12, 1924 3 Sheets-Sheet 1
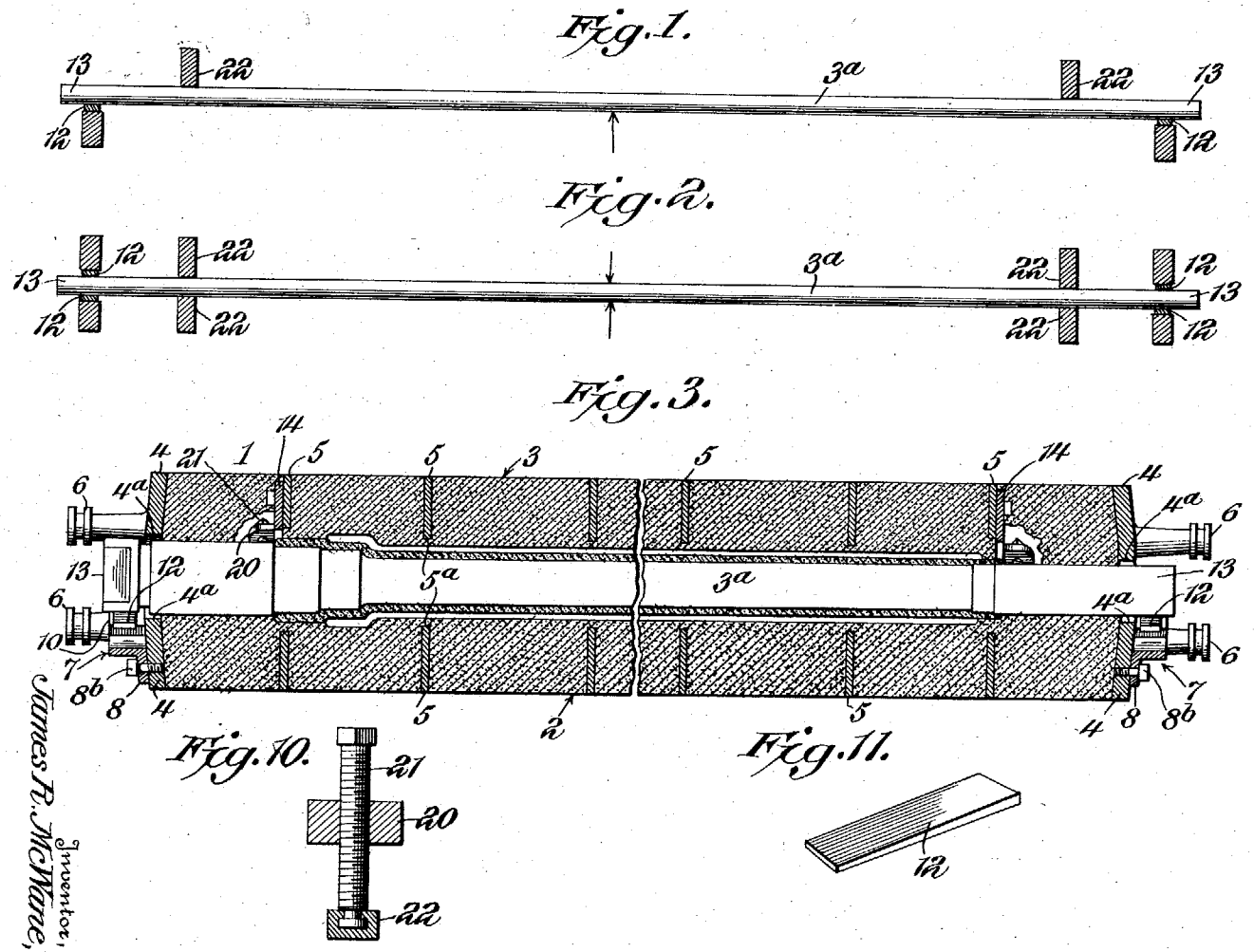
Inventor,
James R. McWane,
By Philip E. Siggers,
Attorney July 2, 1929. J. R. McWANE Re. 17,362
MEANS FOR SUPPORTING CORE BARS IN FLASKS
Original Filed Dec. 12, 1924 3 Sheets-Sheet 2
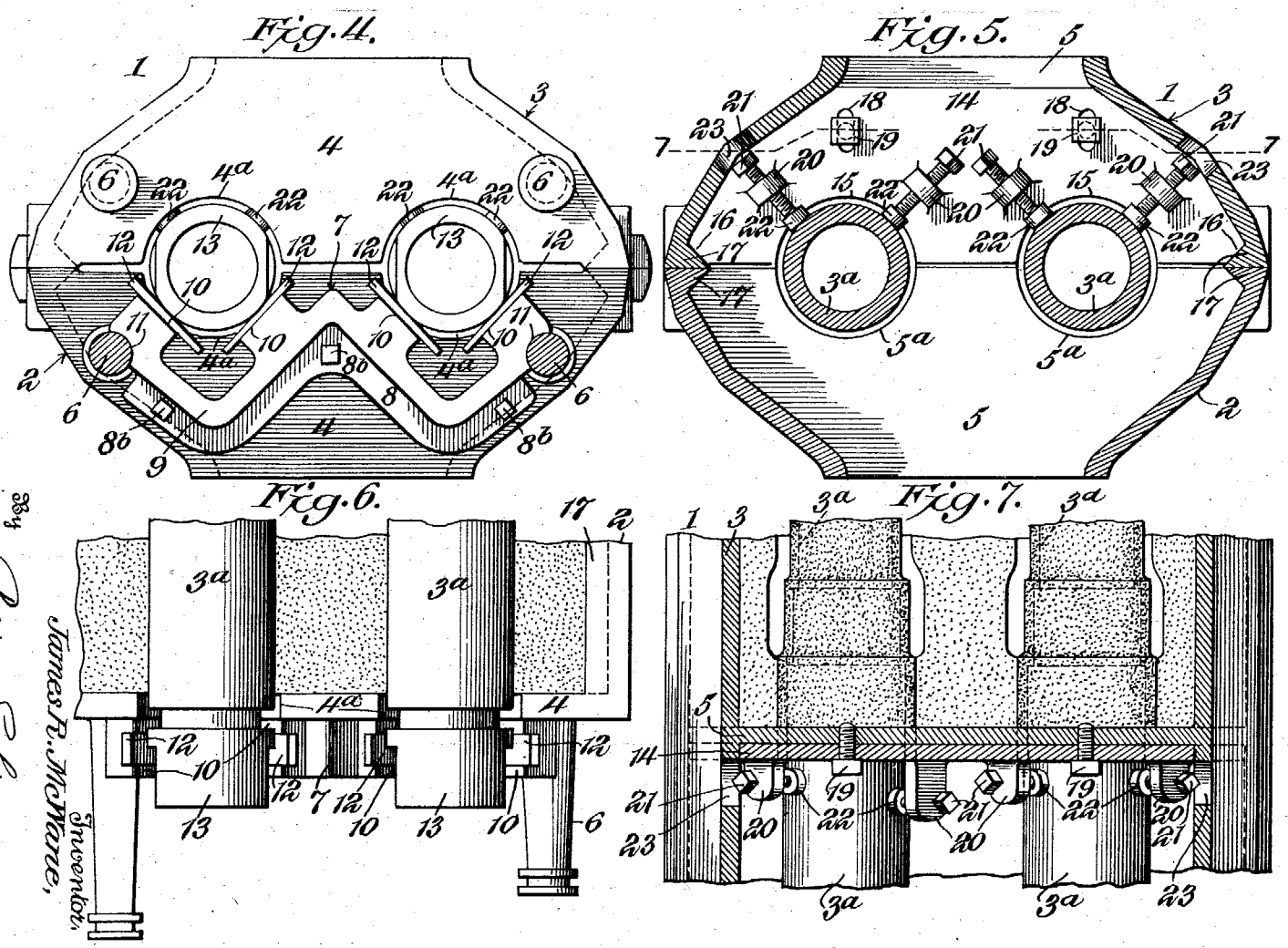
Inventor,
James R. McWane,
By Philip E. Siggers,
Attorney July 2, 1929. J. R. McWANE Re. 17,362
MEANS FOR SUPPORTING CORE BARS IN FLASKS
Original Filed Dec. 12, 1924 3 Sheets-Sheet 3
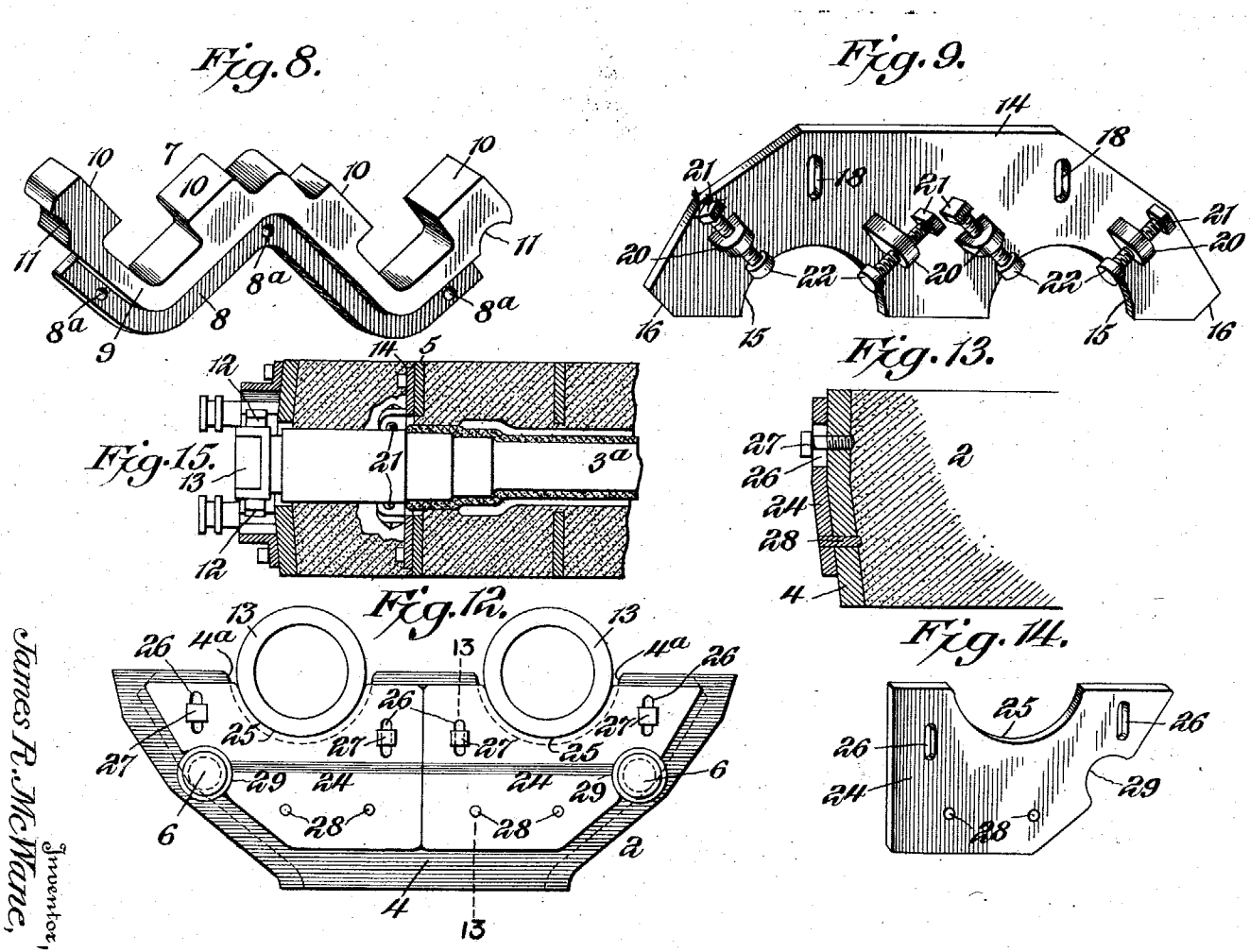
Inventor,
James R. McWane,
By Philip E. Siggers,
Attorney Reissued July 2, 1929. Re. 17,362

UNITED STATES PATENT OFFICE.

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA.

MEANS FOR SUPPORTING CORE BARS IN FLASKS.

Original No. 1,578,083, dated March 23, 1926, Serial No. 755,512, filed December 12, 1924. Application for reissue filed March 21, 1928. Serial No. 263,486.

DIVISION A.

This invention relates to means for supporting core bars in flasks.

The object is to provide means for rigidly supporting core bars of elongated form in flasks, such as are used in the manufacture of pipe or analogous castings by the horizontal method, wherein the flasks are placed on the molding floor in horizontal position for the reception of the molten metal, and wherein it is necessary that the core bar, together with the sand core thereon, shall occupy a true coaxial position in the mold throughout its length, in order to secure a casting of uniform thickness.

Another object is to provide means for this purpose that shall firmly grip the core bar near the ends of the mold, and to resist sagging of the intermediate portion of the core bar and core due to the weight thereof, and also to resist any rising movement of the intermediate portion of the core bar due to the floating action of the inflowing molten metal when the same is poured.

A further object is to provide means which will accomplish the above stated purpose without the necessity for using chaplets to support the core bar at intervals, chaplets being necessarily left embedded in the wall of the casting, the means herein employed being designed to be readily attached to flask sections, such as are in use in horizontal pipe casting operations, without the necessity of any alterations in the same, or the embodiments of the invention may be readily incorporated as an integral part of new cope and drag sections, without interfering in any manner with the present functions of the same.

A full and complete understanding of the invention may be obtained from a consideration of the following detailed description, taken in connection with the accompanying drawings forming a part of this specification, it being understood that while the drawings show practical forms of the invention, the latter is not to be confined to strict conformity with the showing thereof, but may be changed or modified, so long as such changes or modifications mark no material departure from the salient features of the invention, as pointed out in the appended claims.

In the drawings, in which similar reference characters designate corresponding parts throughout the several figures:—

Fig. 1 is a longitudinal view, illustrating diagrammatically the principle involved in one form of the invention;

Fig. 2 is a similar view of another form;

Fig. 3 is a vertical longitudinal section through a double pipe molding flask used in the horizontal method of casting and showing a core bar and core supported therein by the improved means;

Fig. 4 is an enlarged end view of the same;

Fig. 5 is a transverse sectional view thereof;

Fig. 6 is a plan view of the subject matter of Fig. 4, the upper or cope section being removed and showing the ends of the core bars, as used in a double flask, supported in the drag section by the improved means;

Fig. 7 is a horizontal section taken on the line 7—7 of Fig. 5;

Fig. 8 is a detail perspective of one of the outer end supports for the core bars removed from the drag section of the flask;

Fig. 9 is a similar view of one of the inner plates removed from the cope section of the flask;

Fig. 10 is a detail section showing the manner of mounting the set screws carried by the plates of Fig. 9.

Fig. 11 is a detail perspective of one of the wedges used in connection with the outer supports;

Fig. 12 is an end view of a modified form of end support;

Fig. 13 is a detail section taken on the line 13—13 of Fig. 12;

Fig. 14 is a detail perspective view of one of the core bar supporting members shown in Fig. 12;

Fig. 15 is a partial vertical longitudinal sectional similar to Fig. 3, but embodying the modification of Fig. 2.

In the drawings there is illustrated a complete flask 1 used in the manufacture of cast iron pipe, the said casting being done with the flask located on the floor of the foundry and in a horizontal position. The flask comprises the lower section or drag 2, and the upper section or cope 3, which are substantially identical in form, the cope being adapted to be superimposed, in reverse relation, upon the drag, after the sand molds have been made therein, and the core bar $3^a$, having the sand core thereon, has been placed in longitudinal position within the same.

Each flask section is provided with end walls 4 of the form shown (although many other forms may be employed), and a plurality of intermediate webs 5 spaced substantially equal distances apart throughout the lengths of the sections, said webs being preferably formed integrally therewith and serving to strengthen the structure and to hold the sand therein.

The end walls 4 are preferably inclined slightly, as shown in Fig. 3, and are provided with a pair of lifting arms or trunnions 6 at each end of each section, one of said arms or trunnions being longer than the other to facilitate turning of the section, or inverting the same while suspended in the looped ends of lifting cables. This feature is claimed in my Patent No. 1,557,072, dated October 13, 1925.

Adapted to be secured to the outer faces of each end wall 4 of the lower or drag section of the flask, is a cast metal bracket or plate 7 formed preferably of iron and partaking of the shape of the letter W, there being two V-shaped branches joined together and provided with an attaching flange 8 located at its lower and inner edge. The flange 8 is provided with a plurality of bolt openings $8^a$ for the reception of set screws $8^b$, which rigidly secure the brackets in position on the outer faces of the end walls 4.

Each arm of the V-shaped branches is provided with an elevated face or pad 10 formed integrally therewith, said pads extending upwardly and inwardly toward each other, each face being substantially at an angle of 45° to a vertical plane through the axis of the core bar $3^a$, and substantially equidistant from the core bar axis. At the outer ends, each bracket 7 is provided with arcuate recesses 11, which are adapted to rest upon the aforesaid arms or trunnions 6, the latter being round in cross section, and thus strengthening the support of the bracket. The brackets 7 may, however, be otherwise held in position on the end walls, as by welding or brazing the same, as will be readily understood. Thus the brackets are rigidly secured to the end walls, so as to provide a rigid base for wedges to be described.

Tapered wedges 12 are adapted to be driven in between the active faces of the pads 10 and the adjacent extending ends 13 of the core bar $3^a$, where the same project through the openings $4^a$ formed in the end walls 4 of each of the flask sections, after the said core bar has been applied in position, in a manner to be explained. When the wedges are so driven, they are tangential to the core bar, on opposite sides of the vertical plane passing through the axis of the core bar. The effect of driving each wedge individually is to move the core bar or create a pressure on the core bar in a line substantially at right angles to the face of pad 10, and hence at substantially 45° relative to the vertical plane through the core bar axis. Therefore, the effect of driving both wedges (which are of the same shape) an equal distance is the resultant of two lines of force each at 45° to the vertical plane through the core bar axis, that is, a directly upward lifting force or pressure on the core bar ends.

The transverse webs 5 next adjacent to the end walls 4 in the upper or cope sections, are each adapted to support a casting or plate 14 formed to fit transversely within the cope, and having the necessary semi-circular openings 15 formed in its lower edge to correspond with the openings $5^a$ of the webs, and adapted to receive and accommodate the core bar and core, as clearly shown in Fig. 5 of the drawings. The lower outer corners of the plate 14 are cut away at an angle, as at 16, to fit against the abutting flanges 17 formed in both the cope and the drag and to thus receive additional support.

Located substantially over the centers of the openings 15 of the said plate are vertically disposed slots 18, which are adapted to receive the tap screws or bolts 19 threaded into the adjacent web 5, the slots permitting of more readily assembling the plate in position and seating the same upon the flanges 17, after which the screws are tightened.

Outstanding slugs 20, formed integrally with the plate, are suitably apertured and threaded for the reception of set screws 21, arranged on opposite sides of the vertical plane which passes through the axis of the core bar and at equal acute angles to said plane (preferably 45°), said screws 21 carrying swivelled heads 22 adapted to bear upon the core bar, when turned inwardly, to hold the same down, and at the same time resist lateral movement thereof in various directions. The wedges 12 act to hold the ends of the core bar up and also resist lateral movement thereof in various directions, the wedges 12 and screws 21 together holding the core bar against any lateral movement at or adjacent to the points of contact. Deflection of the intermediate portion of the core bar in various directions may, however, be accomplished by proper manipulation of the screws 21 and wedges 12. Thus, deflection downwardly may be effected by driving both wedges 12 very hard, with the core bar initially in contact with both screws 21, and deflection toward the gate may be accomplished by tightening the screw and the wedge on the gate side of the core bar (as viewed in Fig. 4) after the core bar is in contact with the opposed screw and wedge.

When the lower or drag section of the flask is properly rammed on the molding machine to form the mold therein and removed to the casting floor, the core bar 3[a] with the core already formed thereon, is then positioned in longitudinal alinement with the lower half of the mold in the drag and lowered to rest upon the hard packed sand within the end pockets of the drag between the end walls and the first webs. The cope with the complementary half of the mold formed therein is then lowered into position, the flanges 17 abutting entirely around the two members and supporting the weight of the upper section, and the cope and the drag are locked together. The set screws 21 are then turned to contact tightly with the core bar, which may be readily done by removing a portion of the sand over the innermost screws while the outer screws 21 may be easily reached through openings 23 formed in the walls of the cope section and the wedges 12 are then driven into position as described. One of the inner lugs 20 is longer than the other so as to permit offsetting of one of the inner screws 21 relative to the other, so that a wrench may tighten said inner screws without interference, as clearly shown in Fig. 7 of the drawings.

By reference to Fig. 1 of the drawings, it will be seen that the force of the inflowing metal, as indicated by the arrow, tends to raise or float the intermediate portion of the core bar where unsupported within the mold, even though said bar be of a large diameter and sufficiently stiff to support its own weight without perceptible sagging. This upward tendency of the intermediate portion is directed against the set screws which constitute abutments 22, as indicated in Fig. 1 and the result is that the outer end portions of the bar where projecting beyond the abutments are forced to act as levers imparting a downward tendency to the ends of the bar, but this downward tendency is effectively resisted by the wedges 12, with the result that after pouring the bar is coaxial with the mold, and thus a substantially uniform thickness of the wall of the casting is assured.

Where smaller diameter core bars are used, which might sag by their own weight, double sets of wedges 12 and double sets of abutments 22 may be employed, as indicated in Figures 2 and 15; it being readily understood that the arrangements already described may be duplicated in both the cope and the drag sections for this last-named purpose, to counteract both the upward pressure of the molten iron and the downward effects of sagging, as indicated by the arrows in Fig. 2.

The heads 22 of the set screws are opposite the coacting wedges, as shown in Fig. 4, and thus the core bar bending action of the molten metal is resisted in all directions, and this resistance is essential, inasmuch as in pouring the molten metal in double flasks, such as illustrated in the drawing, the said metal enters in centrally disposed sprue holes or gates arranged in a longitudinal series, one for each pocket between the webs 5, and then passes through laterally disposed gates to the molds at different points along their lengths, so that the metal tends also to force the core bars outwardly as well as upwardly.

In Figures 12, 13 and 14 there is shown a simple form of the invention, wherein the wedges are dispensed with, and the core bar supports are in the form of two identical plates 24 secured upon each end wall 4 of the drag, there being one plate for each core bar. The plates 24 have substantially semicircular openings or seats 25 of the proper diameter for receiving and supporting the ends 13 of the core bar, said seats being elevated above the cut-out portions 4[a] of the end wall 4 of the lower or drag section 2, as indicated by the dotted lines of Fig. 12. Such plates may be used to adapt old types of flasks for use with the core bar holding means of the invention. When making such an adaptation, holes are drilled in the end wall of the drag, and these holes are then tapped for screws or bolts. Because of possible inaccuracies in the location of these holes, the plates 24 have slots 26 through which bolts 27 pass, the slots permitting adjustment of each plate prior to being secured in final position, wherein the core bars will be supported coaxial with the mold. When adjustment of each plate has been made, the bolts 27 will be tightened. To obviate movement of the plates, they will then be drilled, the drill holes extending into the end wall 4, and dowel pins 28 will be driven in the holes, thus making permanent the adjusted position of the plates. Further to insure rigidity of the plates, they are provided with arcuate seats 29 adapted to rest upon the aforesaid trunnions or arms 6. The form of Figs. 12, 13 and 14 is specifically claimed in a division of this application, Serial No. 320,972.

From the foregoing it will be seen that simple, strong and durable means have been provided for easy attachment to cope and drag sections of pipe molding flasks or other flasks for supporting the core bars in alinement with the mold, and to resist the movements thereof incident to the effects of sagging and from the floating and deflecting action of the inflowing molten iron, the said means being arranged in positions so as not to interfere with the placement of the cores or with the application of the cope section to the drag. It will also be seen that the form of the invention illustrated in Figures 2 and 15 provides core bar supporting and deflecting means which makes possible a deflection of the central part of the core bar in any lateral direction, so as to resist the floating and sidewise deflecting action of the molten iron and make possible the production of nearly perfect castings in spite of such action. The form of the invention illustrated in Figures 1 and 3–9 inclusive makes possible a directly downward deflection of the central part of the core bar, or a deflection downwardly on a line substantially at 45° to and on either side of the vertical plane passing through the core bar axis, or a deflection along a line between these, but does not permit any upward or directly sidewise deflection as in the case of the other form mentioned (Figures 2 and 15).

What is claimed is:—

1. In means for supporting a core bar in a flask without the use of chaplets, outer supports beneath the bar at the ends thereof, inner abutments bearing on top of the bar adjacent to and spaced from said supports, and wedges adapted to be inserted between the sides of the bar and the supports to press the bar against the abutments and thus resist any upward movement of the intermediate portion of the bar responsive to the floating action of the molten metal.

2. In molding flasks, a core bar having a core thereon, a pair of spaced end supports carried by each end of the drag section of the flask to support the weight of the core bar, and a pair of spaced abutments carried by each end portion of the cope section of the flask and contacting with the core bar in longitudinal spaced relation to said supports, the two supports and the two abutments together resisting movement of the core bar in a radial direction.

3. In means for supporting a core bar in a flask for casting pipe or the like, outer pairs of supports adapted to bear beneath and on top of the core bar at the ends thereof, and inner pairs of abutments adapted to bear beneath and on top of the core bar in spaced relation to the supports, the supports and abutments resisting movement of the intermediate portion of the core bar in any direction, said supports and said abutments contacting with the core bar beyond the ends of the core.

4. In means for supporting a core bar in a flask for casting pipe or the like, upper and lower members carried respectively by the cope and drag sections of the flask and located adjacent to the ends of the core bar, wedges interposed between the members and the core bar to grind the core bar, and upper and lower abutments carried respectively by the cope and drag sections and contacting with the bar near the members to resist movement of the intermediate portion of the core bar.

5. Means for supporting core bars in flasks, comprising a combined bottom and side core bar support adjacent to each end of the flask, and an abutment bearing on the top and sides of the bar and spaced at a distance from the lower support to constitute a fulcrum when the pressure of the inflowing iron causes the terminal portion of the bar to act as a lever and to resist side movement as well as upward movement of the central portion of the bar.

6. Means for supporting core bars in flasks, comprising combined bottom and side supports located adjacent to the ends of the bar, and abutments bearing on the upper portion of the bar at a distance from the supports to constitute fulcrums when the pressure of the inflowing iron causes the terminal portions of the bar to act as levers, the supports and abutments then resisting side or upward movements of the central portion of the bar.

7. Means for supporting a core bar in a flask comprising upper and lower coacting core bar clamping means located near the ends of the flask, and upper and lower opposed abutments bearing on the bar in spaced relation to said clamping means.

8. Means for supporting a core bar in a flask comprising upper and lower coacting core bar clamping means located near the ends of the flask, and upper and lower opposed abutments located within the flask and bearing on the bar in spaced relation to said clamping means, said abutments lying in substantially the same plane and being adjustable toward the bar to clamp it.

9. Means for supporting core bars in flasks without the use of chaplets comprising brackets adapted to be secured to the outer faces of the end walls of the lower or drag section of the flask, each bracket having opposed faces for the reception of wedges to bear against the undersides of the projecting ends of the core bar and constituting supports therefor, plates adapted to be secured in the upper or cope section of the flask, and adjustable set screws mounted in said plates and adapted to contact with the upper sides of the core bar in spaced relation to the supports to resist rising of the intermediate portion of the bar by the floating action of the molten metal.

10. Means for supporting core bars in flasks without the use of chaplets comprising brackets adapted to be secured to the ends of the drag sections of flasks, each of said brackets having opposed faces below and substantially equidistant from the longitudinal axis of the core bar and inclined relative to the vertical, wedges adapted to be driven in between the faces and the projecting ends of the core bar to support the same, plates adapted to be secured to one of the transverse webs of cope sections of flasks, said plates having opposed lugs arranged above the axis of the core bar, and set screws mounted in the lugs so as to be inclined relative to the vertical on opposite sides of said axis and adapted to bear down on the core bar adjacent to the supports to resist bending of the core bar through the action of the incoming metal.

11. Means for supporting, without the use of chaplets, core bars in flasks, composed of lower or drag sections and upper or cope sections, said means comprising brackets adapted to be secured to the outer faces of the end walls of the drag sections and having a pair of pads or faces each arranged at an angle of substantially 45° to the vertical plane passing through the axis of the core bar and below the same, other brackets adapted to be transversely secured in the cope sections in spaced relation to the pads or faces and having lugs provided with adjustable set screws each arranged at an angle of substantially 45° to the vertical plane passing through the axis of the core bar and adapted to bear down on the core bar, and wedges adapted to be driven in between said pads or faces and the core bar in opposition to the set screws to resist vertical or lateral movement of the bars.

12. Means for supporting, without the use of chaplets, core bars in flasks composed of lower or drag sections and upper or cope sections, said means comprising brackets adapted to be secured to the outer faces of the end walls of the drag sections and having a pair of pads or faces arranged at an angle to the vertical plane passing through the axis of the core bar and on opposite sides of said axis, and wedges adapted to be driven in between said pads or faces and the core bar to resist vertical or lateral movement of the bar.

13. Means for supporting core bars in flasks without the use of chaplets comprising brackets transversely mounted in the cope section and having lugs, and set screws mounted in said lugs at an angle to the vertical plane passing through the axis of the core bar and adapted to bear with their ends on the core bar.

14. Means for supporting core bars in flasks without the use of chaplets comprising brackets transversely mounted in the cope section and having lugs, some of said lugs being larger than others, and set screws mounted in said lugs so as to be movable substantially radially of the core bar into contact with the periphery thereof, the different sizes of the lugs permitting placing of adjacent set screws in different planes so that they may be tightened without interference.

15. In means for supporting core bars in flask sections, wedge seats carried on the outer faces of the ends of the drag, said seats being arranged at opposite angles beneath and in spaced relation to the core bar, wedges adapted to be driven inwardly and downwardly between the seats and the core bar to support and resist side movement of the core.

16. In means for supporting core bars in flask sections, wedge seats carried on the outer faces of the ends of the drag, said seats being arranged at opposite angles beneath and in spaced relation to the core bar, wedges adapted to be driven inwardly and downwardly between the seats and the core bar to support and prevent side movement of the core, lugs carried by the cope in spaced relation to the ends thereof and in spaced relation to the core bar, and set screws threaded through the lugs and directed inwardly and downwardly at opposite angles to bear on the core bar and hold the core bar down upon the supporting wedges and resist side movement of the core bar.

17. A flask for cast iron pipe and the like comprising, in combination, a cope; a drag; means for securing the cope and drag together; a core bar whose ends project beyond the ends of the flask; the drag, when rammed, having areas of hard packed molding sand affording initial and practically unyielding supports for the end portions of the core bar so as to hold it spaced from the mold and obviate injury thereto; adjustable means interposed between the drag and the core bar and bearing on the core bar from the underside near each end; and adjustable means bearing on the upper side of the core bar at points spaced from each end; said adjustable means, when tightened against the core bar, together supporting the core bar independently of the areas of molding sand and deflecting said bar intermediately.

18. A flask for cast iron pipe and the like comprising, in combination, a cope; a drag; means for securing the cope and drag together; a core bar whose ends project beyond the ends of the flask; a set of adjustable means bearing on the core bar from the underside near each end; and a set of adjustable means bearing on the core bar from the upper side spaced from each end; each of said adjustable means movable independently of the others so as to bear against the core bar in a line which extends at an acute angle to the vertical plane which passes through the longitudinal axis of the core bar, the two members being symmetrically arranged relative to said vertical plane so that equal movement of the two members of a set results in vertical movement or deflection of the core bar, and so that movement of one member of a set results in a lateral deflection in a direction which is at an acute angle relative to said vertical plane.

19. A flask comprising, in combination, a cope and a drag; a bracket secured upon the end wall of the drag; an adjustable member carried by the bracket and contacting with the core bar to exert pressure on the core bar along a line which makes an acute angle with the vertical plane passing through the longitudinal axis of the core bar; a projection integral with the end wall of the drag and to one side of and beneath the core bar; the bracket being formed so as to fit against said projection so that deflection of the bracket due to the reaction from the adjustable member is eliminated and the bracket provides a rigid support.

20. A flask having core bar supporting and deflecting means comprising a set of four adjustable core-bar-contacting members near each end of the flask and carried thereby, and another set of four adjustable core-bar-contacting members near the first set, but more removed from the end of the flask.

21. A flask having core bar supporting and deflecting means comprising a set of four adjustable core-bar-contacting members near each end of the flask and carried thereby, and another set of four adjustable core-bar-contacting members near the first set but more removed from the end of the flask; each member of each set being so adjustable as to exert pressure against the core bar along a line at 45° to the vertical plane passing through the longitudinal axis of the core bar.

22. A flask carrying a plurality of core-bar-contacting elements all of which are capable of exerting pressure laterally on the core bar, said element cooperating to deflect the intermediate portion of the core bar laterally in any desired direction.

23. A flask for casting tubular articles comprising, in combination, means on the flask near each end for gripping a core bar at points spaced from its ends and providing effectually fulcrums on which the intermediate portion of the core bar may rock; and two sets of adjustable core-bar-contacting elements carried on the flask outside of the aforesaid means and nearer the ends of the core bar; said core-bar-contacting elements being capable of deflecting the intermediate portion of core bar laterally in any desired direction when the core bar is properly gripped by the means aforesaid.

24. A flask for casting tubular articles comprising, in combination, means on the flask near each end for gripping a core bar at points near the ends of the core bar and providing effectually fulcrums on which the intermediate portion of the core bar may rock; and two sets of adjustable core-bar-contacting elements carried on the flask inside of the aforesaid means and spaced from the ends of the core bar; said core-bar-contacting elements being capable of deflecting the intermediate portion of the core bar laterally in any desired direction when the core bar is properly gripped by the means aforesaid.

Signed at Birmingham, Alabama, this 17th day of March, 1928.

JAMES R. McWANE.